Aug. 18, 1931.  O. A. ROSS  1,819,844
FOCUSING FINDER
Filed Sept. 24, 1927   2 Sheets-Sheet 1
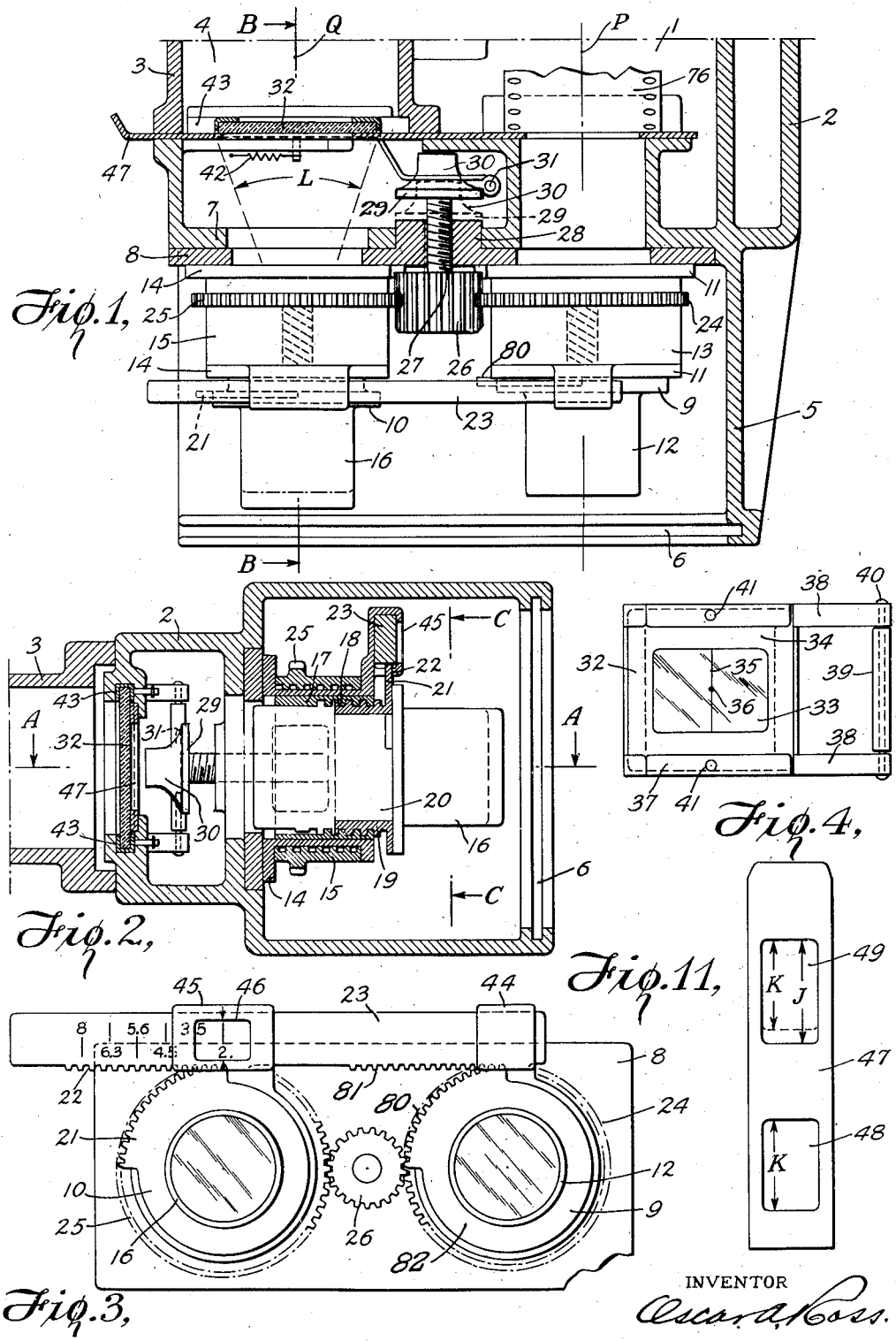

Aug. 18, 1931.  O. A. ROSS  1,819,844
FOCUSING FINDER
Filed Sept. 24, 1927   2 Sheets-Sheet 2
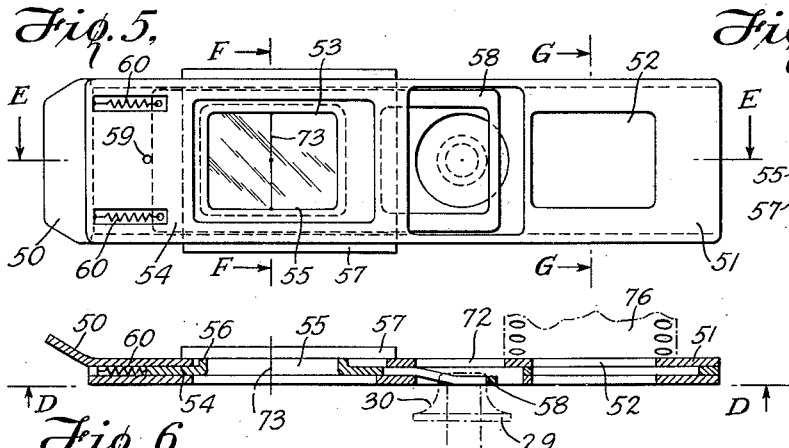
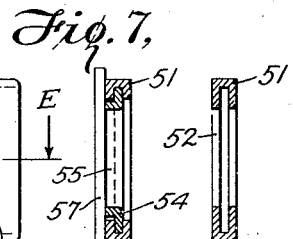
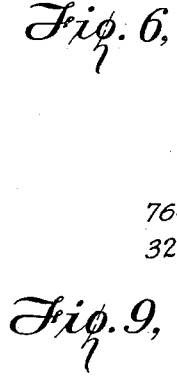
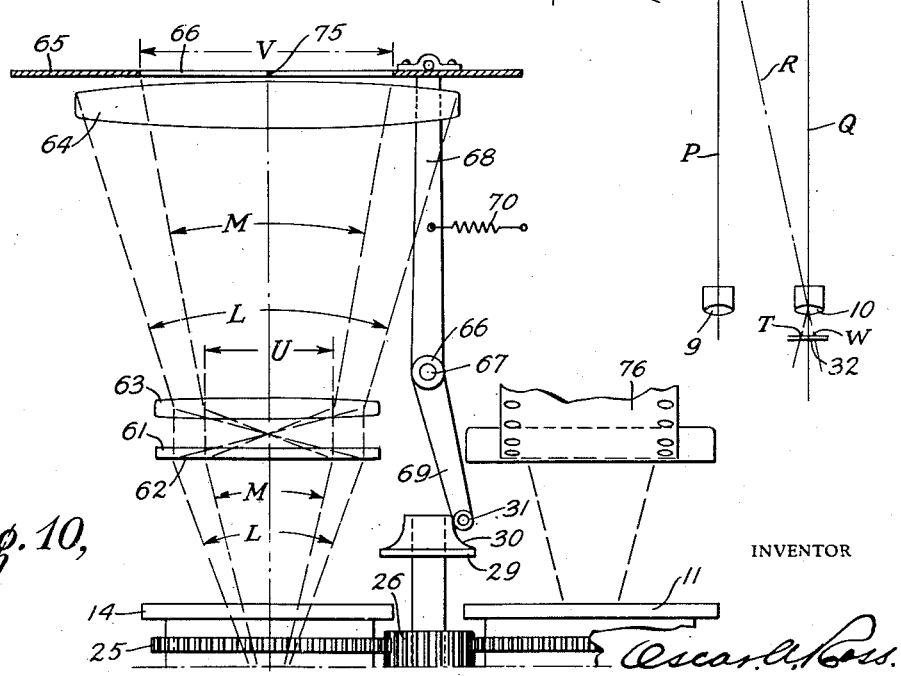
INVENTOR
Oscar A. Ross.

Patented Aug. 18, 1931

1,819,844

UNITED STATES PATENT OFFICE

OSCAR A. ROSS, OF NEW YORK, N. Y.

FOCUSING FINDER

Application filed September 24, 1927. Serial No. 221,785.

This invention relates to focus and finder devices and more particularly to that type wherein the finder is arranged parallel to the photographing lens.

Whereas this improvement may be associated with any camera, it has been preferably shown as applied to what is known as the Akeley professional motion picture camera and provides means whereby a photographer may simultaneously photograph, focus and observe the field being photographed, the delineation of the field or "frame" viewed in the finder being substantially identical to the delineation of the field or "frame" being photographically deposited on the motion picture film at the photographic aperture of the camera.

Another object is to vary the axial distance between the finder lens and the image receiving member with respect to axial distances between the photographing lens and the film as the photographing lens is stopped down to compensate for change in focal length which characteristic many faster lenses seem to possess.

Another object is to vary the relative axial distances between the finder and photographing lenses and their image receiving surfaces whereby a substantial major portion of the "depth of field" will lie to the rear of the object focussed upon.

Other objects and advantages will appear as the description of the invention progresses and the features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the device, it being understood that, within the scope of what hereinafter is claimed, divers changes in the form, proportions, size and minor details of the structure may be without departing from the spirit of the invention, or sacrificing any of its details.

In describing the invention in detail, reference is had to the accompanying drawings, where I have illustrated embodiments of the invention, and wherein like characters of reference designate corresponding parts throughout the several views, and in which:—

Figure 1 is a sectional view taken on line A—A of Fig. 2, and Fig. 2 is a sectional view taken on line B—B of Fig. 1, and Fig. 3 is an elevational view of the lens mount taken on line C—C of Fig. 2, and Fig. 4 is a detailed view, and Fig. 5 is an elevational view of a modified form of mask and is taken on line D—D of Fig. 6, and Fig. 6 is a sectional view of the same taken on line E—E of Fig. 5, and Fig. 7 is another sectional view taken on line F—F of Fig. 5, and Fig. 8 is also a sectional view taken on line G—G of Fig. 5, and Fig. 9 is a diagrammatic view illustrating part of the accomplishment of the invention, and Fig. 10 is a part diagrammatic, part elevated view of a modified form of the invention, and Fig. 11 is a plan view of a mask.

Referring to Figs. 1, 2, 3 and 4, camera 1 comprises body 2, to which is secured cover or door 3, and forming part of the latter of which is finder tube or barrel 4.

Body 2 has a three-sided housing 5, adapted to hold in slot 6 auxiliary photographing devices in front of the finder and photographing lenses.

Suitably secured to the aperture panel 7, is lens mount 8, comprising photographing lens assembly 9, and finder lens assembly 10.

The photographing lens assembly 9, comprises the usual flange 11, lens barrel 12, and focusing cylinder 13, of well known form.

The finder lens assembly 10, in addition to the usual flange mount 14, and focusing cylinder 15, comprises a modified lens barrel 16, the axial movement of which is controlled from two sources. First, rotation of focusing cylinder 15 will cause axial movement of sleeve 17, having threaded portion 18 mating with threaded collar 19, adapted to rotate in groove 20 of lens barrel 16, said collar also having a toothed sector 21, adapted to be actuated by rack 22 of diaphragm lever 23; and, second, axial movement of barrel 16 may also be obtained by movement of diaphragm lever 23, causing collar 19 to be rotated and whereby said collar will move axially with respect to sleeve 17, also carrying lens barrel 16 therewith. Lever 23 is also formed with a rack 81 meshing with gear sector 80 formed on diaphragm control barrel 82, the movement of said lever also effecting rotation of said barrel, said rotation effecting a variation in size of the photographing aperture in known manner.

Forming part of focusing cylinder 13, is gear 24, and of cylinder 15, is gear 25, both of said gears meshing with pinion 26, secured to threaded shaft 27, operating in bearing 28. Also secured to shaft 27 is cam cylinder 29, the surface 30 of which engages collar 31 of ground glass assembly 32.

Ground glass assembly 32 comprises ground glass, or image receiving member 33, having masked portion 34, hair line 35, and frame center masker 36, and is suitably mounted in frame 37, having extension 38—38 interposed, between which is roller 39, revolving on pin 40. Suitably secured to frame 37, are pins 41—41, adapted to receive one end of springs 42—42, the outer end of which is secured to body 2. Said ground glass assembly 32 is adapted to slide in grooves 43—43 formed in body portion 2.

Diaphragm bar 23, is adapted to slide in bearing 44, forming part of photographing lens mount 11, and bearing 45, forming part of finder lens mount 14, the latter bearing having opening 46, through which the diaphragm opening indications as f2, f3 .5, etc., are read. Movement of bar 23 to the left opens the diaphragm, or diaphragms, if two are employed, and movement to the right "stops down" said diaphragm.

Mask 47 whereas shown with the standard size "frame" apertures 48—49, may be supplied with any desired form of mask. However the viewing aperture 49 is elongated inwardly as shown by dimension J, the dimension K illustrating the normal size of a "frame".

Referring to Figs. 5, 6, 7 and 8, showing a modified form of mask 50, and wherein a portion thereof is made movable the mask body 51 is formed of sheet metal and has photographing aperture 52, and viewing aperture 53. Slideably mounted in mask body 51, is rectangular viewing plate 54, having viewing aperture 55, the flange 56 of which is adapted to abut ground glass 57, and a tongue 58 adapted to be actuated by cone surface 30 of cone 29. Viewing plate 54, is normally restrained to the right against stop 59 by springs 60—60.

Referring to Fig. 10, showing a modified form of the invention, the ground glass 61 is mounted stationary, the image receiving surface 62 having a viewing field L substantially larger than the standard frame M. The inverted image received by ground glass 61, is re-inverted by an optical system 63, whereby the enlarging lens 64 displays the photographed field as ordinarily viewed.

Suitably mounted adjacent to the receiving end of the finder barrel 4, is the sliding mask 65, having viewing aperture 66, substantially larger than the dimensions of an ordinary frame, the size being proportioned to the magnification of lens 64. Mask 65, is adapted to have lateral movement and is actuated by lever 66, pivoted at 67, the end of 68 of which is pivoted to mask 65, the other end 69, terminating in roller 39, impinging on cone surface 30 by action of spring 70.

Referring to Fig. 12 illustrating diagrammatically the condition more generally known as "parallax" and which the applicant's invention seeks to overcome, the photographic objective 9 and finder objective 10 are mounted with their axes P and Q in spaced parallel relation as also shown by Figs. 1 and 3. As a result the image point or object S appearing on the photographic axis P will not be positioned on the axis Q of the finder objective 10, as will be more fully pointed out hereinafter.

The operation is as follows: As is well known, where a finder lens is placed in spaced relation and parallel to the photographing lens, the delineation of the field of the "frame" viewed in the finder is not the same as that actually photographically deposited on film, more especially if the scene photographed is a "close-up", namely, substantially close to the camera, and as will be more apparent by reference to Fig. 12, where lenses 9 and 10 are shown in spaced parallel relation and having axes P and Q. If an object S is focussed upon through the photographic lens 9, the object will appear at W on the ground glass member 32, obviously substantially off the vertical center line 35 of the frame. This condition is more generally known as parallax.

In applicant's invention the ground glass member 32, or its equivalent, is automatically moved laterally by means of cam surface 30 coacting with roller 31, whereby the hair line 35 is maintained substantially in intersecting relation to the axis P of the photographic lens 9, irrespective of where line R intersects said axis as the object S is moved. This is accomplished as follows:—With the parts as shown in Figs. 1, 2 and 3, the focusing cylinders 13 and 15 have been turned clockwise to their fullest extent, whereby the lens barrels 12 and 16 have been moved inwardly to the "infinity" position of focusing. Under this condition the counter-clockwise rotation of pinion 26 has caused screw 27, and cam 29, to be moved inwardly, whereby cam 30 has restrained ground glass member 32 to the extreme right and whereby the hair line 36 is substantially incident with the axis Q of the finder lens 10. Assume now that the object point S is to be focussed upon. The focusing cylinder 15 is rotated counter-clockwise, the photographer viewing the field through the finder barrel 4, and along the axis Q. Simultaneously gear 25, rotates pinion 26 clockwise and cam 29 is restrained outwardly whereby ground glass member 32 to be moved to the left under tension of spring 42. Also simultaneously, pinion 26 causes gear 24 to also rotate clockwise, whereby photographing lens 9 is maintained in relative focus with finder lens 10. As soon as the object point at S appears sharp on the ground glass 33, rotation of focusing cylinder 15 is stopped and at which time the hair line 35 will substantially register with the point W (Fig. 12) and whereby the center of the "frame" as actually photographed will also appear as the center of the viewed "frame" in the finder.

Referring to Figs. 5, 6, 7, and 8, showing a modified arrangement of shifting the viewed field in the finder, the ground glass 57 is in this instance stationary and without a masked portion as 33, the delineation of the frame being determined by the aperture 55 of aperture plate 54. As the focusing cylinder 15 is rotated counter-clockwise to focus on object S, the cam 29 (Fig. 5) is moved outwardly from opening 72, and the cam surface 30, impinging on tongue 58, acts to permit viewing aperture plate 54 to move to the left under the action of springs 60—60, and therefore aperture 53 will also move to the left across the face of ground glass 57 until the wire, or hair line 73, moves to a point corresponding to $w$ (Fig. 12) and whereby the delineation 55 of the field viewed in aperture 53 will be substantially the same as that photographically recorded by the photographing lens 9. The mask 50, may be substituted for the mask 47.

Referring to Fig. 10, illustrating another modification of the invention, the ground glass 61 is also stationary and without a masked portion as 34. The image rays represented by the included angle L, and which appear on the surface 62 are, as is well known, inverted. To correct said image to normal an optical system 63, of well-known structure, is employed, whereafter said image is enlarged by the enlarging lens 64, also in well-known manner, the enlargement as shown being from the dimension U to the dimension V of viewing aperture 66. As shown in Fig. 10, the various parts are normal or focussed for infinity. As focusing cylinder 15 is rotated counter-clockwise to focus on object S, and cam 29 moves outwardly permitting roller 31 to move to the left whereby lever 66 is rotated clockwise causing mask 65 to move to the right until the hair line 75 registers with point T, (Fig. 12) and whereby the delineation of the field, viewed through aperture 66, will be substantially the same as the delineation of the frame recorded by the photographing lens 9.

It will be noted that in this last named modification the movement of mask 65 was from left to right or in a reverse direction from ground glass 32, and aperture plate 54, of Figs. 5 and 6, this reverse movement being required due to the restoration of the image rays to normal by use of optical system 63.

The included angle L represents the "covering power" of the finder lens 10, (Fig. 10) whereas the included angle M represents width of a "frame", one-half the difference of said angles representing the latitude of movement of the correcting factors 32, 54, or 65.

Referring to Fig. 9, diagrammatically illustrating the effect of one purpose of the adjustment obtained by sleeve 18, collar 19, and special lens barrel 16, it is well known that the "depth of focus" of a photographic lens diminishes as the speed of the lens is increased, all other factors being equal, and that in many cases of motion picture photographing this "depth of focus" is wholly inadequate if a fast lens is worked at full operation, or maximum opening of the diaphragm. In most instances of this character the principal or object focussed upon is the foremost in the scene. It is also usual that the "depth of focus" lies substantially an equal distance to the front or rear of the object focussed upon. Therefore, if the lens is focussed upon the principal object in the foreground, only one-half of the "depth of focus" lies to the rear thereof. Applicant has therefore conceived that if the photographing lens is focussed at the lesser distance than the finder lens, and the finder lens is focussed on the object, the photographing lens can be made to sharply record the principal object focussed upon and also all objects to the rear thereof for a distance equal to the entire "depth of focus" of the lens in use. As an illustration of the foregoing it will be noted that, (see Fig. 1) the finder lens barrel 16 projects outwardly beyond photographing lens barrel 12. In other words, the finder lens is focussed on line X (Fig. 9) whereas the photographing lens barrel 12 is focussed upon line Z, the distance Z P representing the "depth of focus" of the lens combination in photographing lens barrel 12, of photographing lens mount 9, and the distance X F representing the "depth of focus" of the lens combination in lens barrel 16 of finder lens mount 10.

It will be noted that the object S, focussed upon by the finder lens is located at the point of foremost "depth of focus" of the photographing lens and that therefore the total "depth of focus" Z P of the photographing lens 9, lies to the rear of said object. In other words, a maximum of "depth of focus"

is obtained to the rear of the object focussed upon.

As the diaphragm bar 23 is moved to the right (Fig. 3) and the diaphragm in photographing lens 9 is "stopped down", collar 19 screws into sleeve 17, whereupon said collar moves to the left (Fig. 2) and when fully stopped down both the finder lens 10, and the photographing lens 9, are substantially the same distance from the image receiving surfaces of the ground glass assembly 32 and the film 76.

The finder lens 10 is preferably not supplied with a diaphragm whereby a maximum of light may be obtained for "stopped down" conditions of the photographing lens 9. If desired such a diaphragm may be employed and the relative movement of lens 10, caused by movement of lever 23, adjusted accordingly.

As an example of a further accomplishment of relatively changing the focal distance between the finder and photographing lenses 10 and 9, and their respective image receiving surfaces, it is also well known that certain fast lenses have the characteristic of changing their focal length when "stopped down" as compared to "wide open" positions of the diaphragm.

It is also well known that "stopping down" of the finder lens materially reduces the illumination of the viewed image in the finder and that it is therefore advantageous to operate the finder lens at "wide open" aperture. In applicant's invention this change of focal length of lenses is compensated for by relatively changing the distances between the finder and photographing lenses and their image receiving members, the ground glass and the film or emulsion of the photographic plate.

Where the adjustment provided by sleeve 17, collar 19, and diaphragm bar 23 is employed to compensate for the aforesaid change of focal length, when "stopping down" the photographing lens unit 9, and finder lens unit 10 are substantially the same relative distance from their image receiving members when the diaphragm of the photographing lens 9 is "wide open". (In this latter accomplishment no diaphragm is employed in the finder lens.) As the diaphragm bar 23 is moved to the right to "stop down" photographing lens 9, the screwing action of collar 19 acts to move finder lens unit 10, whereby the relative distance of the two aforesaid lens units is either lengthened or shortened.

If the characteristic of the lenses employed is such that the focal length of the photographing lens is shortened as it is "stopped down", the finder lens unit 10 is caused to move inwardly, or decrease the distance between said lens unit and the image receiving surface 33. If the characteristics are such that the focal length is increased as said lens 9 is "stopped down", then as the said lens 9 is stopped down by movement of diaphragm bar to the right, the screwing action of collar 19 acts to move the finder lens unit 10 outwardly, or increase the distance between said lens and the said image receiving surface 33. In other words, the finder lens 10, working at full operation is maintained at a focal length corresponding to the change of focal length of the photographing lens as it is "stopped down" or "opened up", as required by the peculiar light conditions surrounding the object or scenes being photographed.

The lens units 9 and 10 are preferably what is known as "matched lenses", the cam surface 30 being proportioned to give suitable compensating movement to the members 32, 54 and 65 whereby the delineation of the "frame" as recorded on the image receiving surfaces of said members substantially corresponds to the delineation of the "frame" recorded at the photographing aperture irrespective of at what distance from the camera said lenses are focussed upon.

It will be evident that the cam 29 may be substituted by an ellipsoidal pinion and the roller 39 by a toothed rack meshing therewith, and, if required a train of gears may be added between the gears 24 and 25 and pinion 26 if said ellipsoidal pinion and rack are employed.

What I claim is:—

1. In combination a camera, a focussable photographing lens and a focussable finder lens secured thereto, means for causing simultaneously axial movement of the lenses, a view finder arranged in the path of the image rays formed by the finder lens and means actuated by the lens moving means for causing movement of the finder whereby the delineation of the field recorded at the photographing aperture of the camera will substantially conform to the delineation of the field viewed at the finder.

2. In combination, a camera, a photographing lens and a finder lens secured thereto, means for causing simultaneous axial movement of the lenses, a view finder arranged in the path of the image rays formed by the finder lens, means actuated by the lens moving means for causing movement of the finder whereby the delineation of the field recorded at the photographing aperture of the camera will substantially conform to the delineation of the field viewed at the finder, a diaphragm arranged in the path of the photographing lens, means for actuating the diaphragm, and means actuated by the diaphragm actuating means for varying the relative axial position of the lenses independently of the first named axial movement means.

3. In combination, a camera, a body therefor, a lens mounting member detachably secured to the body, a photographing and view finding lens unit secured to the lens mounting member, means for moving the lens units simultaneously whereby both are maintained at the same focus, a view finder arranged in the optical path of the finder lens unit, and means actuated by the lens moving means for effecting movement of the view finder whereby the delineation of the image field recorded by the photographing lens unit will be substantially the same as the delineation of the image field viewed at the finder.

4. In combination, a camera, a photographing lens unit and a finder lens unit secured thereto, a focusing lens barrel supported by each unit, means for moving both lens barrels units simultaneously whereby both lenses are maintained at the same focus, a view finding image depicting member arranged in the path of the view finder lens unit relatively movable therewith, and means actuated by the lens unit moving member for effecting movement of the image depicting member whereby the delineation of the image field recorded by the photographing lens unit will be substantially the same as the delineation of the image field as viewed on the image depicting member.

5. In combination, a camera, a photographing lens unit and a view finder lens unit supported thereby, means for focusing the lens units simultaneously whereby both units are maintained at the same focus, an image depicting member arranged in the optical path of the view finder lens unit relatively movable therewith, indicating means supported thereby for visably indicating the center of the image field depicted on the image depicting member, a mask member removably supported by the camera having a photographic aperture arranged in the optical path of the photographing lens unit and a view finding aperture arranged in the optical path of the view finder lens unit, and means actuated by the focus means for moving the image depicting member whereby the center of the image as photographically recorded by the photographing lens unit will substantially register with the center of the image as indicated by the indicating means when viewed on the image depicting member.

6. In combination, a camera, a photographing lens units supported thereby, a gear supported thereby for the focusing thereof, a view finder lens unit supported by the camera, a second gear supported thereby for the focusing thereof, a pinion engaging both of the gears whereby focusing of one unit will similarly focus the other unit, means for supporting the pinion, a view finder image depicting member arranged in the optical path of the view finder lens unit relatively movable therewith, and means actuated by the pinion supporting means for moving the image depicting member whereby the delineation of the image field recorded by the photographing lens unit will be substantially the same as the delineation of the image field viewed at the image depicting member.

7. In combination, a camera, a lens mounting unit detachably supported thereby, a photographing lens barrel supported by the unit, a gear supported by the photographing lens barrel, a view finder lens barrel supported by the unit, a gear supported by the view finder lens barrel, a pinion meshing with both of the gears whereby focusing of one lens barrel will similarly focus the other lens barrel, means for supporting the pinion, a view finder image depicting member arranged in the optical path of the view finder lens barrel relatively movable therewith, and means actuated by the pinion supporting means for moving the image depicting member whereby the delineation of the image recorded by the photographing lens barrel will be substantially the same as the delineation of the image viewed at the image depicting member.

8. In combination, a camera, a photographic objective supported thereby, a diaphragm supported by the objective member, means rotatably supported by the objective member for varying the aperture of the diaphragm, a reciprocating member supported by the camera arranged by movement in one direction thereof to rotate the diaphragm supporting member whereby the aperture is increased in diameter and in the other direction is decreased in diameter, aperture size reference marks formed on the reciprocating member for indicating the size of the aperture in the diaphragm, and indicating means supported by the camera arranged to register with the reference marks whereby the size of the aperture openings will be indicated as the reciprocating member is moved for the variation in size thereof.

9. In combination; a camera, an objective supporting unit detachably supported by the camera, a photographic objective member supported by the unit, a diaphragm supported by the objective member, means rotatably supported by the objective member for varying the aperture size of the diaphragm, a reciprocating member supported by the objective member, arranged by movement in one direction thereof to rotate the diaphragm supporting member whereby the aperture is increased in diameter and in the other direction is decreased in diameter, aperture size marks formed on the reciprocating member for indicating the size of the aperture in the diaphragm, and indicating means supported by the camera arranged to register with the reference marks whereby the size of the aperture openings will be indicated as the reciprocating member is moved for the variation in size thereof.

10. In combination; a camera, a lens mounting unit detachably supported thereby, a photographing lens member supported by the unit, a view finder lens member supported by the unit, means for effecting simultaneous axial movement of the members, a view finder arranged in the optical path of the finder lens member, means actuated by the lens member moving means for effecting movement of the finder whereby the delineation of the field recorded at the photographing aperture of the camera will substantially conform to the delineation of the field viewed at the finder, a diaphragm arranged in the optical path of the photographing lens member, means for varying the aperture size therein, and means actuated by the diaphragm aperture varying means for varying the relative axial positions of the lens members independently of the first named axial movement means.

11. In combination; a camera, a photographic objective and a view finder objective supported thereby, a diaphragm supported by the photographic objective member, means rotatably supported by the photographic objective member for varying the aperture size of the diaphragm, a reciprocating member supported by the camera arranged by movement in one direction thereof to rotate the diaphragm supporting member whereby the aperture is increased in diameter and in the other direction is decreased in diameter, aperture size reference marks formed on the reciprocating member for indicating the size of the aperture in the diaphragm, indicating means supported by the camera arranged to register with the reference marks whereby the size of the aperture openings will be indicated as the reciprocating member is moved for the variation in size thereof, and means actuated by the reciprocating member for effecting a relative axial movement of the objectives whereby the finder objective is focussed at a longer distance from the camera than the photographic objective.

12. In combination a camera, a photographic objective member and a view finder objective members supported thereby, a diaphragm arranged in the optical path of the photographic objective member, means for varying the size of the aperture of the diaphragm, and means actuated by the aperture varying means for effecting a relative axial movement of the objective members whereby one objective member is focussed at one distance from the camera and the other member at another distance therefrom.

In testimony whereof, he has signed his name to this specification, this 20th day of September, 1927.

OSCAR A. ROSS.

DISCLAIMER 1,819,844.—*Oscar A. Ross*, New York, N.Y. FOCUSING FINDER. Patent dated August 18, 1931. Disclaimer filed July 15, 1933, by the patentee, the assignee, *Sarah L. Burns*, assenting.

Hereby enters this disclaimer to that part of the claim in said specification which is in the following words, to wit:

"1. In combination a camera, a focussable photographing lens and a focussable finder lens secured thereto, means for causing simultaneously axial movement of the lenses, a view finder arranged in the path of the image rays formed by the finder lens and means actuated by the lens moving means for causing movement of the finder whereby the delineation of the field recorded at the photographing aperture of the camera will substantially conform to the delineation of the field viewed at the finder."

[*Official Gazette, August 8, 1933.*]